US011350150B2

(12) United States Patent
Jain et al.

(10) Patent No.: US 11,350,150 B2
(45) Date of Patent: May 31, 2022

(54) METHOD FOR ESTIMATION OF QUALITY OF EXPERIENCE (QOE) METRICS FOR VIDEO STREAMING USING PASSIVE MEASUREMENTS

(71) Applicant: Hughes Network Systems, LLC, Germantown, MD (US)

(72) Inventors: Kaustubh Jain, McLean, VA (US); Chi-Jiun Su, Rockville, MD (US); Sriram Vasudevan, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/727,819

(22) Filed: Dec. 26, 2019

(65) Prior Publication Data
US 2021/0204011 A1    Jul. 1, 2021

(51) Int. Cl.
G06F 15/16     (2006.01)
H04N 21/2662   (2011.01)
(Continued)

(52) U.S. Cl.
CPC ......... *H04N 21/2662* (2013.01); *G06N 20/00* (2019.01); *H04L 43/0852* (2013.01); *H04L 65/80* (2013.01); *H04N 21/23439* (2013.01)

(58) Field of Classification Search
CPC . H04L 43/0852; H04L 65/80; H04N 21/2662; H04N 21/23439; G06N 20/00
(Continued)

(56) References Cited

U.S. PATENT DOCUMENTS

| 7,212,498 B2 * | 5/2007 | Austin ............. H04N 21/23418 |
| | | 709/231 |
| 8,744,432 B2 * | 6/2014 | French ................. H04W 24/08 |
| | | 455/418 |

(Continued)

FOREIGN PATENT DOCUMENTS

WO    2019091591 A1    5/2019

OTHER PUBLICATIONS

International Search Report and Written Opinion dated Mar. 9, 2021 by the International Searching Authority (European Patent Office) in PCT Application PCT/US2020/066545.

*Primary Examiner* — Bharat Barot
(74) *Attorney, Agent, or Firm* — NovoTechIP International PLLC

(57) ABSTRACT

Computer-implemented systems and methods for diagnosing and correcting connectivity problems in a network are provided. The method includes obtaining, at a network node disposed at an edge of the network, measurements of one or more attributes of network traffic exchanged between a content server and a client device via the network. The network traffic is associated with streaming video content transmitted from the content server to the client device over the network. The method also includes analyzing the one or more attributes of the network traffic to estimate Quality of Experience (QoE) performance metrics related to the streaming video content at the client device, and adjusting one or more network operating parameters of the network responsive to QoE performance metrics falling below a predetermined threshold.

22 Claims, 10 Drawing Sheets
(5 of 10 Drawing Sheet(s) Filed in Color)

(51) Int. Cl.
  *G06N 20/00* (2019.01)
  *H04L 43/0852* (2022.01)
  *H04L 65/80* (2022.01)
  *H04N 21/2343* (2011.01)

(58) Field of Classification Search
  USPC .................................. 709/202–203, 231–232
  See application file for complete search history.

(56) References Cited

U.S. PATENT DOCUMENTS

| | | | |
|---|---|---|---|
| 8,973,077 B2 * | 3/2015 | Huysegems | ... H04N 21/234327 |
| | | | 709/231 |
| 10,298,653 B1 * | 5/2019 | Cheng | ..................... H04L 65/80 |
| 2015/0067184 A1 * | 3/2015 | Parthasarathy | ..... H04L 41/5009 |
| | | | 709/231 |
| 2015/0373077 A1 * | 12/2015 | Ramamurthi | ........... H04L 65/80 |
| | | | 709/219 |
| 2017/0034233 A1 * | 2/2017 | Funge | ............... H04N 21/23406 |
| 2017/0048297 A1 * | 2/2017 | Funge | ..................... H04L 65/80 |
| 2017/0093648 A1 | 3/2017 | ElArabawy et al. | |
| 2017/0195393 A1 | 7/2017 | Su | |
| 2018/0131593 A1 | 5/2018 | Jain | |
| 2018/0270126 A1 * | 9/2018 | Tapia | ..................... H04L 43/08 |
| 2019/0222491 A1 | 7/2019 | Tomkins et al. | |

\* cited by examiner

METHOD FOR ESTIMATION OF QUALITY OF EXPERIENCE (QOE) METRICS FOR VIDEO STREAMING USING PASSIVE MEASUREMENTS

BACKGROUND

Video streaming has become a ubiquitous feature of the Internet and one of the largest and fastest growing classes of traffic on the Internet. Poor streaming video quality can have a significant negative impact on a user's experience, and many of the complaints received by Internet Service Providers (ISPs) are related to poor video streaming quality of experience (QoE). Thus, there are significant areas for new and approved mechanisms for monitoring QoE associated with streaming video content and for proactively detecting and responding to degradations in QoE.

SUMMARY

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

Among examples of disclosed methods are computer-implemented methods for diagnosing and correcting connectivity problems in a network. The method includes obtaining, at a network node disposed at an edge of the network, measurements of one or more attributes of network traffic exchanged between a content server and a client device via the network, wherein the network traffic is associated with streaming video content transmitted from the content server to the client device over the network; analyzing the one or more attributes of the network traffic to estimate Quality of Experience (QoE) performance metrics related to the streaming video content at the client device; and adjusting one or more network operating parameters of the network responsive to QoE performance metrics falling below a predetermined threshold.

Among disclosed examples are implementations that include a processor storing processor-executable instructions that, when executed, cause the processor to: obtain, at a network node disposed at an edge of the network, measurements of one or more attributes of network traffic exchanged between a content server and a client device via the network, wherein the network traffic is associated with streaming video content transmitted from the content server to the client device over the network; analyze the one or more attributes of the network traffic to estimate Quality of Experience (QoE) performance metrics related to the streaming video content at the client device; and adjust one or more network operating parameters of the network responsive to QoE performance metrics falling below a predetermined threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings and figures depict various implementations in accordance with the present teachings, by way of example only, not by way of limitation. In the figures, like reference numerals refer to the same or similar elements. For purposes of convenience the drawings are not necessarily made to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

The term "server," as used herein, means a logic resource or aggregation of resources providing functionalities that include, but are not limited to, functionalities by which a resource meets the ordinary and customary meaning of "server."

The term "plurality of servers" as used herein can encompass, without limitation, any population of two or more Internet servers, without limitation as to geographic location or distribution, without limitation as ownership or control; and can encompass any population of two or more virtual servers hosted on or by any processing resource, irrespective of hardware configuration or architecture.

The term "server stack" as used herein encompasses, without limitation, any among, and any combination or sub combination of, a server; a plurality of servers; a server resource; a virtual server; and a cloud server.

The term "multi-configurable," as used herein, encompasses, without limitation, configurations that are selected and fixed at time of design; configurations that are selected and fixed at time of, or prior to completion of manufacture; configurations that remain changeable or selectable after completion of manufacture, and can be selected and fixed at time of installation; configurations that remain changeable or selectable after completion of installation, including re-configuration that is any of periodic, aperiodic, automatic, user-selectable, and/or via service intervention.

Figure 1:
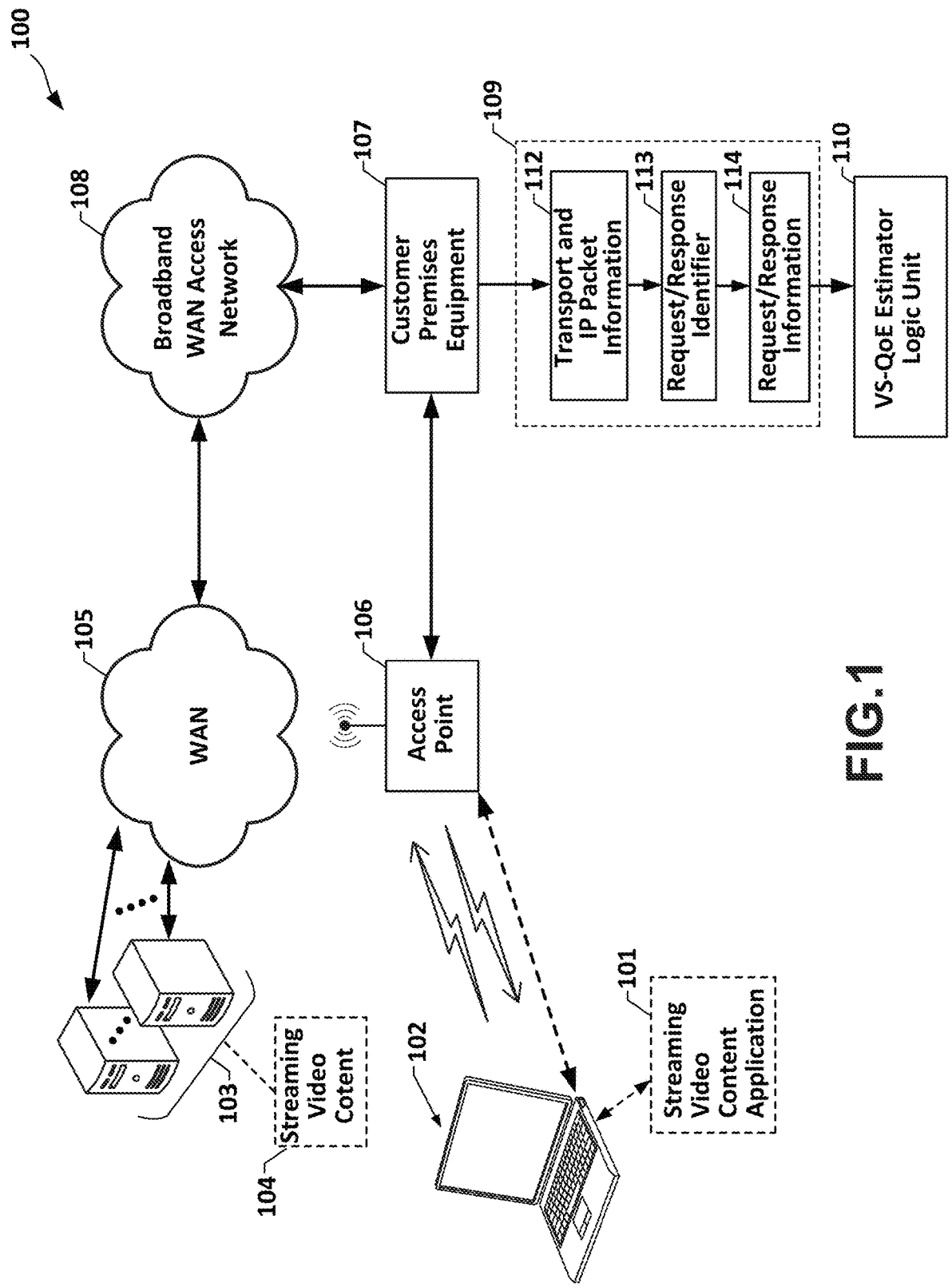
FIG. 1 is a functional block diagram of an implementation of an example network according to this disclosure, supporting streaming video content traffic, and with passive measurement and estimation of various streaming video content stats, and estimation of streaming video content performance metrics and of QoE.
Figure 2:
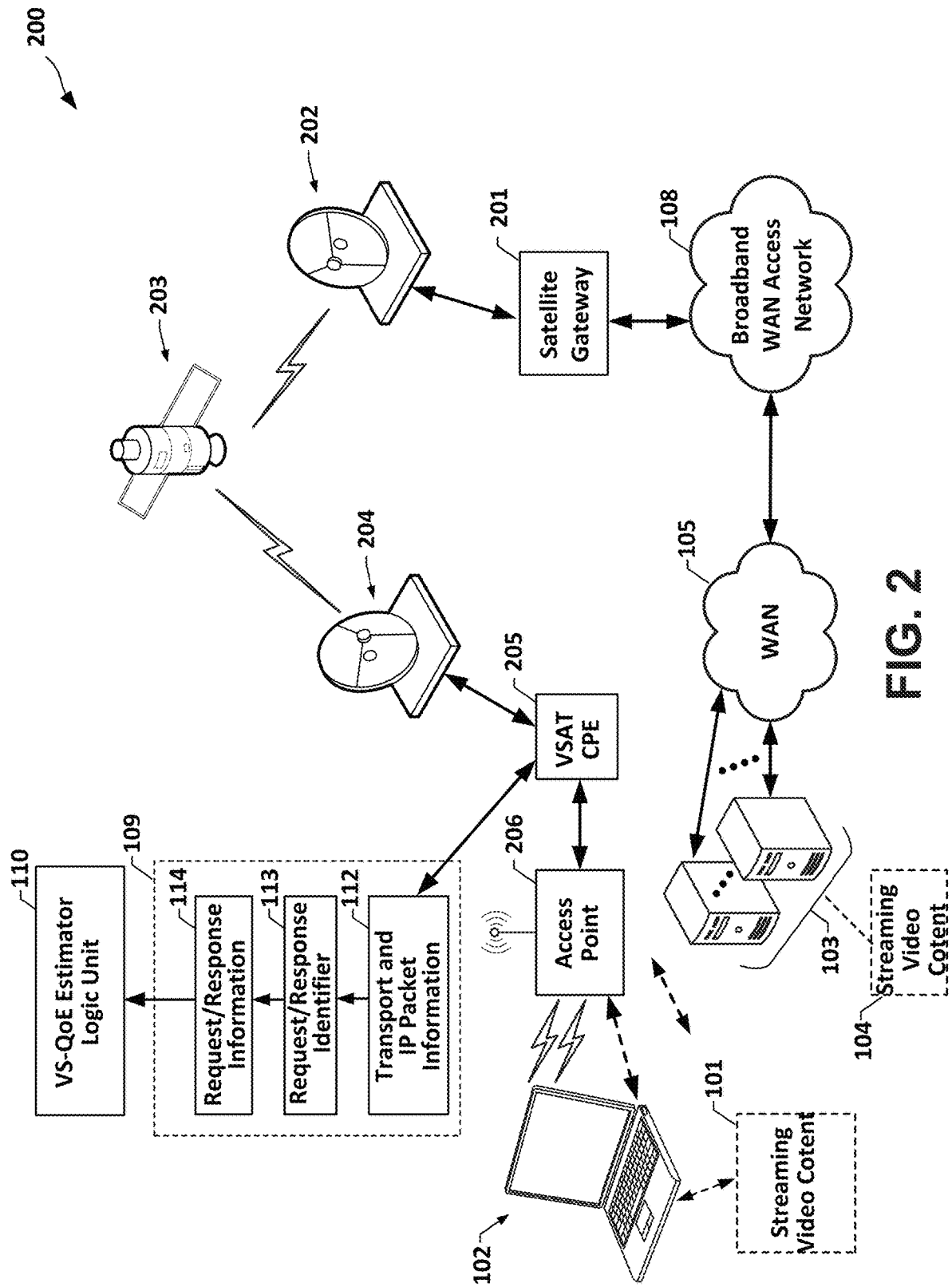
FIG. 2 is a functional block diagram of an implementation of a system supporting streaming video content traffic, with a physical layer that includes a satellite link, and providing passive measurement and estimation of various streaming video content stats, and estimation of streaming video content performance metrics and of QoE.

Some implementations discussed in the examples that follow reference the Transport Control Protocol/Internet Protocol ("TCP/IP"). However, these examples are for illustrative purposes and are not limiting. The disclosed concepts and aspects thereof may be used with other protocols, either current or future, that support a client application accessing and downloading streaming media content The techniques disclosed herein provide a technical solution to the technical problem faced by ISPs of identifying issues that may negatively impact a customer's QoE related to consuming streaming media on their personal electronic devices (also referred to herein as "client devices" or "user equipment"). The techniques disclosed herein provide a technical solution that enables an ISP to passively collect data that can be used to determine one or more objective QoE metrics that may be used to estimate the QoE at the client device. The techniques disclosed herein are "passive" in the sense that these techniques do not require that the ISP have access to the client device on which the streaming media is being consumed. No hardware or software is required at the client device, and no additional network traffic is generated by these techniques. A technical benefit provided by these techniques is that the ISP may proactively diagnose network issues that may negatively impact customer QoE and dynamically adjust one or more network operating parameters to correct these issues without having to rely on the customer feedback to alert the ISP to issues impacting customer QoE. These techniques may be implemented in a network node located at the edge of the ISPs network to provide QoE metrics obtained by monitoring network traffic as close to the client device as possible on the ISPs network. FIGS. 1 and 2 illustrate two example network configurations in which the techniques disclosed herein may be implemented.

FIG. 1 is a functional block diagram of an implementation of an example network system 100 (hereinafter "system 100") according to this disclosure, supporting streaming video content traffic between a streaming video content application 101 running on a client device or user equipment (UE) 102, and one or more content servers (collectively represented as a server stack 103) hosting streaming video content 104. The server stack 103 may also host other content, such as streaming audio content, applications, web pages, and or other content that may be accessed by a user via the UE 102.

While FIG. 1 illustrates the UE 102 as a laptop computer, the UE 102 is not limited to being implemented as a laptop computer. Other devices that may be used to implement the UE 102 include, without limitation, smart phones, tablet computers, desktop computers, notebook computers, game consoles, various multimedia devices, smart wrist watches, and Internet of Things (IoT) devices. The streaming video content application 101 may be implemented as a software application that is configured to receive and playback streaming media content. The streaming video content application 101 may be a dedicated application that allows the user to playback streaming video content on a display of the UE 102 or on an external device, such as a monitor, television, or other device capable of receiving a wired and/or wireless signal from the UE 102.

The server stack 103 may be communicably coupled to a Wide Area Network (WAN) 105 to facilitate sending data to and receiving data from other networked devices, such as the UE 102. The UE 102 may also access the WAN 105 to send and/or receive data, and the streaming video content application 101 running on the UE 102 may request streaming media from the server stack 103 and receive the requested streaming media from the server stack 103 via the network access available to the UE 102. The UE 102 may access the WAN 105 via one or more intermediate devices, such as the via an access point 106, which may provide a wired and/or wireless network connection. The access point 106 may implement Wi-Fi and/or other wireless communications protocols. The access point 106 may implement Ethernet and/or one or more other wired communications protocols. The access point 106 may be connected to customer premises equipment (CPE) 107. The CPE may comprise a digital modem that provides access to broadband WAN access network 108 provided by an ISP. The CPE 107 may be connected with the broadband WAN access network 108 via a "last mile" optical fiber or coaxial cable.

The system 100 may include a multiple-level stat monitor 109. The multiple-level stat monitor 109 may be connected to or integrated with the CPE 107. The multiple-level stat monitor 109 can be configured to provide passive monitoring of network traffic passing through the CPE 107 without interfering with the network traffic or creating additional network traffic. The multiple-level stat monitor 109 may be configured to identify network traffic associated with requests for streaming media content from the UE 102 and responses comprising streaming media content from the server stack 103. The multiple-level stat monitor 109 may output various measured and estimated QoE metrics may be provided to the video streaming QoE estimation logic unit 110 (also referred to herein as the "VS-QoE estimation logic unit 110"). Examples of the types of QoE metrics that may be collected and of how the logic unit 110 may estimate the QoE based on the QoE metrics will be provided in the example implementations that follow.

In some implementations, multiple-level stat monitor 109 may be configured to include a transport and IP packet information data block 112, request/response identifier data block 113, and request-response information data block 114. One example specific implementation of the multiple-level stat monitor 109 can be in accordance with U.S. patent application Ser. No. 15/344,684, titled "Application Characterization Using Transport Protocol Analysis," filed Nov. 7, 2016, (hereinafter "the '684 application") which is hereby incorporated by reference in its entirety. For example, the implementation, operations, and outputs of the FIG. 1 transport and IP packet information data block 112 can be provided by the '684 application item 420, which is visible in '684 FIG. 4, and is described by the '684 specification. Likewise, the implementation, operations, and outputs of the FIG. 1 request/response identifier data block 113 and request-response information data block can be provided by the '684 application items 430 and 440, respectively, both being visible in '684 FIG. 4, and described by the '684 specification.

As described in the '684 application, the multiple-level stat monitor 109 can apply, for example, "tcpdump," which is a Berkeley Software Distribution (BSD) packet analyzer for TCP/IP and other protocols; or "libpcap," which is a generally available packet capture tool; or Microsoft Message Analyzer, in combination with the '684 application "Algorithm 1," or "Algorithm 2," or both algorithms, and generate outputs that identify beginnings and endings of request/response periods during a TCP connection, and generate request/response information for the identified request/response periods.

The streaming video content 104 may be made up of one or more web objects. The streaming video content may be divided into a sequence of small HTTP-based file segments comprising a short interval of the overall media content. The streaming video content 104 can be downloaded using several TCP connections over which the objects are requested. Other objects, such as web page objects may also be downloaded. Some of the objects can be hosted (hence requested) from different servers (different domain names and destination IP addresses). In each TCP connection, one or more HTTP requests are issued by streaming video content application 101 to a server of the server stack 103 to request web objects and the server responds with a HTTP response which include the web objects. For example, a HTTP request may request one or more segments of streaming media content from a content server of the server stack 103, and the content server may response with an HTTP response that includes the one or more segments of streaming media.

An HTTP request and an HTTP response may be composed of one or more TCP/IP transmissions, User Datagram Protocol (UDP), QUIC over UDP, or transmissions using yet another transport protocol. A request may be initiated by the streaming video content application 101 transmitting a forward packet carrying a HTTP GET request specifying a requested resource. The requested resource may be identified by a Universal Resource Locator (URL) or Universal Resource Indicator (URI) associated with streaming media content. The server stack 103 may, in response to the request from the streaming video content application 101, transmit one or more reverse packets comprising a portion of the requested resource. The transport protocol connection used for the HTTP request and HTTP response may be reused for additional request/responses exchanges between the streaming video content application 101 and the server stack 103.

The multiple-level stat monitor 109 may generate connection-level data (hereinafter "CLD"), for each transport-protocol connection. The multi-level stat monitor 109 may also generate, for each HTTP/HTTPS object detected as requested by the streaming video content application 101, object-level data (hereinafter "OBD"). An "object" as used herein may refer to video segments of streaming video content or other content requested by the streaming video content application 101. The object-level stat data may indicate, or may indicate an approximation of, stats for each of a plurality of objects comprising a video stream accessed by the client device. Example CLD may include, for a given connection, Server IP Address, Destination IP Address (where "Destination" may be the streaming video content application 101), Server Port, and Destination Port, connection start time, connection end time, the number of objects in the connection, and the total number of bytes sent and received within the connection. Example OBD may include HTTP/HTTPS Request-Response sizes and timing information, and certain connection information, e.g., the above-described Server IP address, Destination IP address, Server Port, and Destination Port. The OBD connection information may also be used to match the object with the connection. Example OBD information may also include an index of the object (hereinafter referred to, alternatively, as "objectIndex") within the connection, time at which the object was requested (startRequestTime), time when the response started (startResponseTime), time when the response ended (endResponseTime), request size in bytes (requestSize), response size in bytes (responseSize), number of packets in the request, and number of packets in the response. The multiple-level stat monitor 109 may generate the above-described CLD and OBD for each of the transport protocol connections and objects detected. The CLD and OBD data may be further processed, as will be described in the examples that follow, to derive QoE metrics from the CLD and OBD data that may be used to estimate QoE at the UE 102 regarding streaming video content and/or other streaming media.

Object-level statistics may alternatively be obtained using Transport Layer Security (TLS) record-layer information, instead of transport-layer information. One example implementation of obtaining object-level statistics using TLS record-layer information can be a process configured in accordance with U.S. patent application Ser. No. 14/986,551, titled "Maximizing Quality of Service for QoS Adaptive Video Streaming via Dynamic Application-Layer Throughput Rate Shaping," filed Dec. 31, 2015, (hereinafter "the '551 application") which is hereby incorporated by reference in its entirety. In other implementations, object-level stat data may be estimated. For example, the multiple-level stat monitor 109 can be configured to detect IP packet bursts communicated by a server of the server stack 103 to the streaming video content application 101. The multiple-level stat monitor 109 can detect bursts in different directions to approximate request and response sizes and their timing based on the direction of the bursts. The request size can be approximated based on bursts from the streaming video content application 101 to the server stack 103, and response size can be approximated based on bursts from the server stack 103 to the streaming video content application 101. This implementation can therefore estimate various QoE metrics, such as the QoE metrics discussed in the example implementations that follow, for non-TCP implementations that use QUIC/UDP or other transport protocols to communicate.

FIG. 2 is a functional block diagram of an implementation of a system 200 providing a modified version of the system 100 illustrated in FIG. 1 in which the physical layer of the ISP's network includes a satellite link. The system 200 can support requests for streaming video content from a content server of the server stack 103 and streaming of the requested content to the UE 102. The system 200 supports estimating of streaming video content QoE at the UE 102 using the various techniques disclosed herein. The streaming video content application 101, UE 102, WAN 105, and content server 103 may each operate as discussed above in connection with FIG. 1. The content server 103 may transmit packets to the UE 102 via WAN 105 by a path that includes broadband WAN access network 108 to satellite gateway 201, or directly to the satellite gateway 201 (via another path not expressly shown in FIG. 2). The satellite gateway 201, via satellite dish 202, can send the packets over a forward uplink (FLU) to orbital satellite 203. The orbital satellite 203 can send such packets over forward downlink (FDL) to Very Small Aperture Terminal (VSAT) dish 204 coupled to a VSAT terminal CPE 205. The UE 102 can communicate with the VSAT terminal CPE 205 via an access point 206. The access point 206 may be a wireless access point and may implement Wi-Fi and/or other wireless communication protocol(s). The wireless access point 206 may provide a wired network connection and may support Ethernet and/or other wired network communications protocols.

The orbital satellite 203 can be, for example, a spaceborne High Throughput Satellite (HTS), arranged in a bent-pipe satellite communication configuration, as illustrated in FIG. 2. The VSAT terminal CPE can be configured to provide a reverse uplink (RLU), to the satellite 203, for communication over a reverse downlink (RDL) to the satellite gateway server 201. In some implementations, more than one satellite may be used, or other types of satellites may be used, including, but not limited to, Fixed Satellite Service (FSS) High Throughput Satellite (HTS). In some implementations, satellite 203 can be configured to receive data from one or more gateway stations for retransmission via spot beams to remote sites located within cells defined by the spot beams.

The examples that follow describe QoE metrics that may be determined by the multiple-level stat monitor 109 based on the CLD and OBD. These QoE metrics may be used to provide an objective estimation of the QoE at the UE 102 related to streaming media content. These QoE metrics fall into three categories: (1) streaming resolution change metrics; (2) buffering (stoppages) metrics; and (3) initial start-up delay metrics. An estimation of the QoE at the client device may be determined, based at least in part, on metrics from one or more of these categories. Each of these metrics can be used to quantize or summarize information associated with different aspects of the user experience that can be used to estimate the object QoE experience for a streaming content consumer at a particular client device.

The following section discusses the first category of QoE metrics related to changes in the resolution of streaming media. Receipt of streaming video content at higher video resolutions, such as High Definition (HD) video of 720p or 1080p, 2K, or 4K may imply a good viewing experience for the user. In contrast, changes in the resolution, particularly from higher to lower resolution, may indicate a poor QoE. Furthermore, even Standard resolution content (480p) may be acceptable for devices having a smaller screen, such as a small handheld computing device like a smart phone or smart watch. Receipt of streaming video content at lower resolutions, such as Medium (360p), Small (240p), or even Tiny (144p), may be indicative of network problems that prevent the ISP's network from sustaining higher resolution streaming. The multiple-level stat monitor 109 may monitor network traffic comprising streaming video content passing through the CPE 107 or other network node at the edge of the network to estimate the resolution of the streaming video content. The multiple-level stat monitor 109 may also detect changes in the estimated resolution of the streaming video content.

The content server of the content stack 103 may utilize video compression algorithms to reduce the size of the content to be transmitted to the UE 102. The content server may, as discussed above, break long video sequences into encoded and encrypted content segments using variable bitrate streaming protocols. For example, the content server may use HTTP Live Streaming (HLS) or Dynamic Adaptive Streaming over HTTP (DASH), which are adaptive bitrate streaming protocols that facilitate high quality streaming of media content over the Internet from traditional HTTP servers. HLS and DASH breaking media content into a sequence of small HTTP-based file segments comprising a short interval of the overall media content. Each encoded video segment may have its own variable size relative to play duration, and thus its own bitrate, dependent upon the content of the video content segments. Video content segments comprising a highly variable scene, such as sports or an action movie, may require a higher encoded bitrate for the same streaming resolution compare to video content segments comprising a low detailed or low variable scene, such as scenery or basic animation. The range of bitrates for each resolution range are therefore somewhat distinct for most videos. Thus, models can be developed based on the rate and size of the objects (the video content segments) being requested by the client device and being served by the network. These models can be used to estimate video resolution and changes in video resolution being experienced at the UE 102 based on the network traffic monitored by the multiple-level stat monitor 109. Examples of such models are discussed in the examples that follow.

Figure 3:
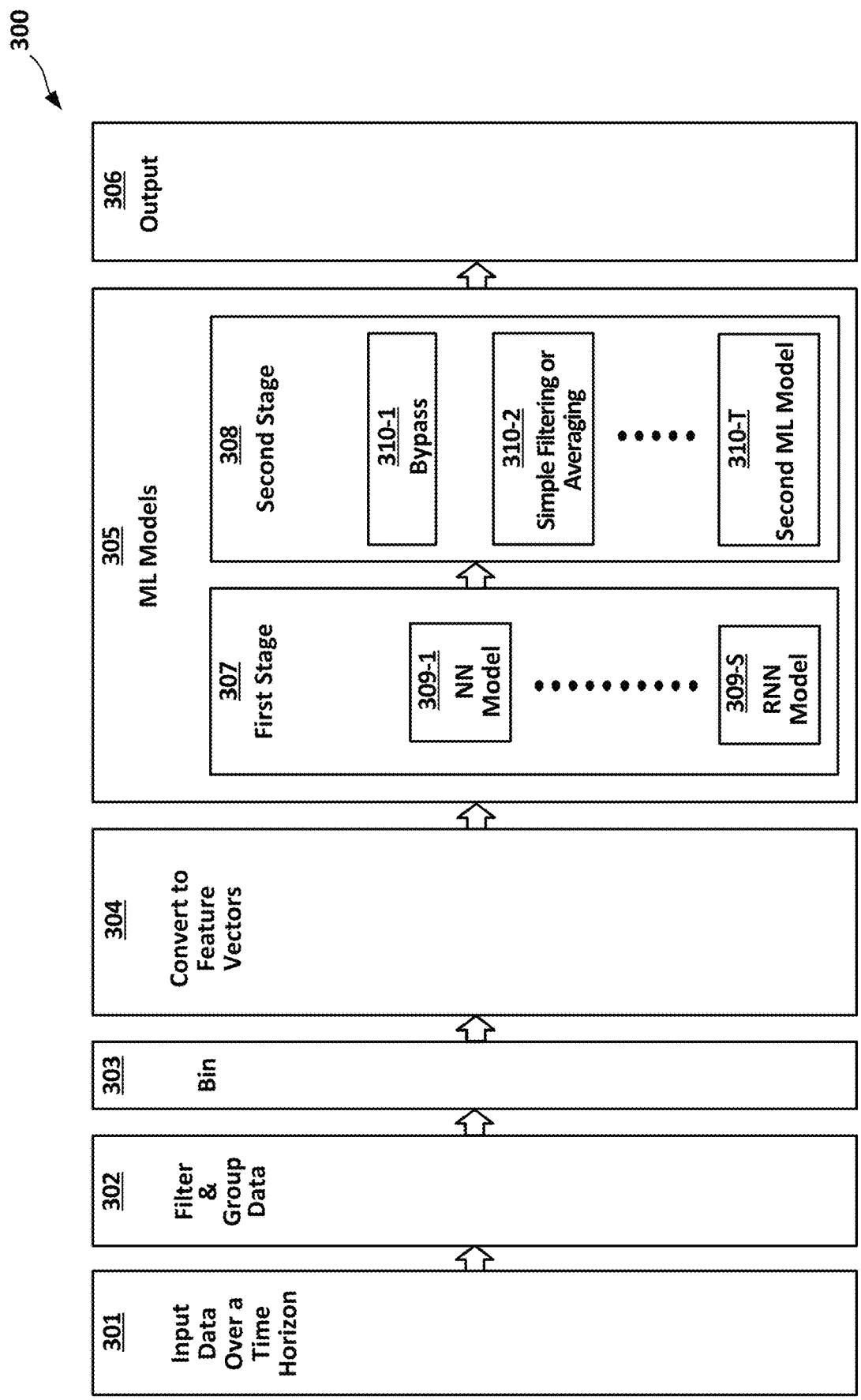
FIG. 3 is a functional block diagram of an example implementation of VS-QoE estimation logic, and including a two-stage estimation logic that can be configurable to provide machine learning model estimations, or statistical model estimations, or both, of video streaming metrics and QoE, in accordance with disclosed concepts.

FIG. 3 is a functional block diagram of illustrating a data pipeline 300 that may be estimate streaming resolution metrics. The data pipeline 300 may be used to implement, at least in part, the VS-QoE estimation logic 110 illustrated in FIGS. 1 and 2. The data pipeline 300 may use machine learning-based (ML-based) models and/or rules-based models to estimate streaming video resolution metrics that can be used, at least in part, to estimate the QoE at the UE 102. The example illustrated in FIG. 3 includes a two-stage, multi-configuration estimation logic 305 that may be used to estimate streaming QoE metrics. The estimation logic 305 can be configured to provide for passive estimation of one or more video streaming performance metrics, including but not limited to estimated resolution of streaming video content. The ML-models may operate similar to the ML models described in U.S. patent application Ser. No. 16/253,558, titled "SYSTEM AND METHOD FOR ESTIMATION OF QUALITY OF EXPERIENCE (QoE) FOR WEB BROWSING USING PASSIVE MEASUREMENTS," filed on Jan. 22, 2019, hereinafter "the '558 application) which is hereby incorporated by reference in its entirety. The ML-based models discussed herein can be trained according to the techniques discussed in the '558 application to estimate various QoE metrics related to streaming media content.

The data input logic 301 can be configured to receive, for example, from the multiple-level stat monitor 109, a stream of CLD and OBD identifying one or more transport protocol connections between the video content application 101 and the server stack 103. The CLD and OBD may identify a Server IP Address (associated with a particular server of the server stack 103, Destination IP Address (associated with the streaming video content application 101), Server Port, and Destination Port, start and end times of the connection, the number of objects in the connection, and the total number of bytes sent and received within the connection. The object-level input data can include, for each object exchange (Request-Response), the above-identified connection information, an object index, and timing and size information for the requests and the responses. The timing and size information can include request-start time, response-start time, response-end time, request size in bytes, request packets, response size in bytes, and response size in packets.

The filter and grouping logic 302 can be configured to sort the object-level input data based, for example, on timing information across the different connections. The sorting can form the object-level input data as time-sequenced sets of stats per object. One example of such sorting basis can be request-start times for the objects. Another example sorting basis can be, but is not limited to, response-end times.

Configuration of the binning logic 303 and convert-to-feature-vector logic 304 may depend in part on the implementation of the streaming video estimation logic 305. For example, according to various implementations, the streaming video estimation logic 305 can include one or more ML models. In other implementations, the streaming video estimation logic 305 can include stat-based models, or rule-based models, or both. The binning logic 303 and convert-to-feature-vector logic 304 can therefore be correspondingly configured to construct the feature vectors in accordance with the particular implementation of the streaming video estimation logic 305.

The streaming video estimation logic 305 can comprise two-stage re-configurable ML performance metric estimation logic can include, as a first stage, a model raw estimation block 307, feeding a second stage, which can be configured as a selectable model smoothing block 308. The first stage of the estimation logic is implemented by the selectable model raw estimation block 307. The estimation block 307 may include a plurality of different raw estimation logic blocks. For example, the raw estimation logic blocks may include S blocks, where S is an integer greater than zero. The raw estimation logic blocks may include, a neural network (NN) estimation logic 309-1, a recurrent neural network (RNN) estimation logic 309-S and, optionally, other blocks (not explicitly visible in FIG. 3). The second stage is implemented by the selectable model smoothing block 308. The selectable model smoothing block 308 may include T different raw estimation logic blocks, where T is an integer greater than zero. The raw estimation logic block may include a neural network estimation logic 310-1, through an RNN estimation logic 310-T. The selectable model smoothing block 308 second stage of the two-stage re-configurable ML video streaming metric estimation logic 305 can include, for example, a bypass block 310-1 (meaning no smoothing), a simple filtering or averaging block 310-2, through to a second ML model logic 310-T and, optionally, other error-reduction blocks (not explicitly visible in FIG. 3).

The example streaming video estimation logic 305 may be configured to estimate streaming resolution at each time delta (e.g., a 1 second interval or other increment of time). The OBD associated with the responses from the content server 103 may be timestamped by the endResponseTime and binned by each time delta. For example, where the time delta is 1 second, the number of bits received for each second (as determined by the endResponseTime) may be summed to determine the number of bits received for each respective time interval. The binned data representing the amount of data received for each interval can be used to produce a feature vector. The feature vector can be provided as an input to a feed-forward Neural Network (NN) model with a t=X, where X is a non-zero integer value indicating a number of time intervals to be included in the, which represents the length of the feature vector. The NN model can be designed to predict one of R resolution classes (Tiny, Small, HD, etc.), where R is an integer value representing the one of the possible resolutions. Estimated resolution for the end of the window is determined, and the input data is fed into the feed-forward NN again after sliding the window by 1 time interval to make the resolution estimation for the next time interval, and so on. Thus, the resolution estimation metric can be determined using a deep learning model for classification. Alternatively, a Recurrent Neural Network (RNN) model with a sliding window having a similar size as the preceding NN example or variable step long short-term memory (LSTM) models may be used. In yet other implementations, the classification models built on traditional machine-learning approaches may be used.

In an example use case that illustrates these concepts, the streaming video estimation logic 305 bins the OBD in 1 second increments based on the endResponseTime and t=120. Thus, the feature vector in this example is 120 seconds long. The number of bits received during each respective 1 second interval are added up to determine a number of bits for that 1 second interval. The NN model predicts one of the R resolutions for the at the end of the window. The window is then slid to the next 1 second interval, and the feature vector is updated to include the binned bit count data for the new window (e.g. data for a one second interval is dropped from the vector and a new one second vector is added to the vector). The window size is not limited to this particular example. Other window sizes, such as t=30, 40, etc. may be selected. Furthermore, a RNN, LSTM, or other models may be used instead of the NN.

Once the estimated resolution for each interval has been determined, the streaming video estimation logic 305 may be configured to output to the output block 306 several objective QoE submetrics related to video resolution, such as but not limited to (1) an average video bitrate (in Kbps), which may be averaged over the entire length of the video content or averaged over a fixed time interval (e.g., 2 minute, 5 minutes, etc.); (2) a longest video resolution utilized, which may be determined based on a most commonly used video resolution over the entire length of the video content or averaged over a fixed time interval; (3) an average video resolution weighted by a fraction of time, by assigning a number to each video resolution (e.g., Tiny=05, Small=1.5, etc.) and by calculating a weighted sum in weighted by a fraction of time that each respective resolution was utilized over the entire length of the video content or over a fixed interval of time; and (4) changes in resolution over a time interval (e.g., a numerical value representing resolution changes per minute or other unit of time), because too many changes in resolution may lead to a poor user experience.

The output block 306 may be configured to receive the QoE submetrics values received from the streaming video estimation logic 305 and estimate a QoE value at the UE 102 based on those submetrics. In some implementations, streaming video estimation logic 305 may include ML models trained to determine QoE submetrics for more than one category of QoE metric and may provide the output block with QoE submetrics from each of these categories of QoE metrics. For example, the streaming video estimation logic 305 may provide QoE submetrics for one or more of the following categories of QoE metrics disclosed herein: (1) streaming resolution change metrics; (2) buffering (stoppages) metrics; and (3) initial start-up delay metrics, and may determine an estimated QoE using the submetrics from multiple categories. Example implementations of the streaming video estimation logic 305 configured to determine buffering metrics and initial start-up delay metrics are described in detail below.

The output block 306 may be configured to determine an estimated QoE based on the QoE submetrics using various techniques. In some implementations, the estimated QoE may be represented as a numerical score based on the QoE submetrics values. In some implementations, the estimated QoE may comprise more than one score. For example, a QoE score may be determined for each category of QoE metric described above. The individual score for each category may be combined into an overall QoE score, which may be compared to a threshold value at which action may automatically be taken to modify one or more operating parameters of the network in an attempt to improve the estimated QoE at the UE 102. In some implementations, the individual QoE scores for each category may be compared to a threshold value associated with that category of QoE metric, and if the QoE score associated with one or more category of QoE metric falls below the respective threshold value associated with that category, action may automatically be taken to modify one or more network operating parameters to try to improve the estimated QoE at the UE 102. Other techniques may be used to determine the estimated QoE score from the QoE submetrics. For example, the score may be determined based on a weighted sum of the QoE submetrics or a weighted sum of the estimated QoE scores for each category of QoE metrics.

In yet other implementations, a rules-based algorithm using a moving bitrate and heuristics may be used to calculate the QoE estimates. However, the deep learning-based models may provide the best results given the possible variations in the encoded video content and the resulting bitrate changes associated with those changes in the encoded video content.

In addition to deriving the four QoE submetrics related to video resolution discussed above, which may be derived from the estimated changes in resolution determined by the streaming video estimation logic 305, an additional layer of filtering or an additional deep learning layer may be applied to each of the submetrics to further improve the accuracy of these submetrics.

Some of the submetrics related video resolution changes may also be estimated using bitrate estimates derived from IP traffic rates. Estimating resolution changes based on IP traffic rates is typically not as accurate as using the OBD as discussed in the preceding examples, because it may be more difficult to detect changes in resolution based on IP traffic rates alone. As discussed above, the bitrate for a particular segment of streaming video content may vary based on how much action is occurring in the content of the video segment. Analyzing the OBD provides a more accurate estimation of the QoE metrics, because the techniques in the preceding examples that analyze the OBD may more accurately detect the changes in the streaming resolution compared to analyzing the IP traffic rates alone.

Some video content or application may not support higher resolutions or may disable higher resolution for constrained devices with little utility of higher resolution. Hence, any analysis of estimated Video QoE can be done in the context of the client device. The models described above work irrespective of the streaming application or the client device being used. However, it is further possible to enhance & fine-tune each of these ML models for different applications & different end devices. If the device type information is available, the device information can be considered when determining the QoE estimation as well.

The following section discusses the second category of QoE metrics related to video buffering. Video buffering or re-buffering may manifest as playback stoppages of streaming video content. Interruptions in playback of the streaming media content are disruptive and a strong indicator of a poor user experience. Considering the importance of buffering, most streaming content players, try to request enough video content in its playback buffer so that the playback is continuous. However, the size of the playback buffer is typically limited and may typically contain somewhere between 30 seconds and 5 minutes of downloaded content. Other implementations may buffer more or less of the content. Buffer size limitations may be utilized to limit wasting network resources if a user stops watching a particular video that is being buffered before the media stream completes. Buffer size limitations may also result from content provider restrictions to reduce the amount of content that may be exposed at one time potential copyright violations. Other factors such as the streaming video content application 101 being used to consume the streaming video content, the end device, and/or other factors may impact the amount of video content that may be buffer.

Buffering the video content at the UE 102 enables the streaming video content application 101 to adapt to changing network connection to provide a good user experience. However, despite this buffering by the streaming video content application 101, changes in network conditions or conditions at the servers 103 providing the streaming video content 104 can still result in the buffering events in which playback is interrupted while the buffer is refilled.

The buffering QoE metrics measure stoppages related to buffering events. Simply using gaps in packets or even between object (video segments) of the streaming media can lead to inaccurate buffering estimates. For example, a large gap between video segments may be because of sufficient playback buffer health and not resulting from a buffering event. Thus, the estimated metric accuracy can be improved by estimating the playback buffer health.

As mentioned earlier, there is a nominal range of bitrate per streaming resolution, even accounting for differences in video content. Using this as additional information, we can build algorithms or models to capture the 'drain-rate' and additions of new video segments (endResponseTime & responseSize) to estimate the playback buffer health. The buffering event estimation of buffering state (or playback buffer health). The techniques disclosed herein can be used to detect when the playback buffer health is 'zero' indicating that the buffer is empty and waiting for new video segments/ object responses to be delivered from the servers 103.

To estimate the buffering QoE metrics, another set of machine-learning based models can be trained as discussed in the preceding examples. The ML models for buffering can use the same inputs and feature vectors discussed in the preceding examples regarding the video streaming resolution QoE metrics. At least one ML model can be trained to output a 'zero' value if no buffering was estimated to be taking place during a respective time delta or to output a 'one' value if buffering was estimated to be taking place during a respective time delta (e.g., a 1 second interval). The bits per second of content received as determined based on endResponseTime and the responseSize values observed in the network traffic between the servers 103 and the UE 102. The ML models can be trained to explicitly use the resolution changes as in the ML models of the preceding examples and an "average drain rate" to estimate whether buffering is occurring for a particular time delta, or a more complex machine learning model can be trained to determine the estimate. The more complex machine learning model may include more layers and/or nodes in a deep learning model.

The example streaming video estimation logic 305 can configured to output several objective QoE submetrics related to buffering to the output block 306, including but not limited to: (1) total buffering duration (e.g. in seconds) over the entire length of the video content or averaged over a fixed time interval; (2) buffering rate or fraction of buffering duration which may be defined in one or more ways: (a) buffering duration/total video duration; or (b) buffering duration/playback duration within a fixed interval (e.g., whether the video played for just X minutes of a Y minute long video content, where X and Y are integer values and X<Y); and (3) buffering event rate, in terms of a number of buffering events/minute (or per another fixed time interval). The latter two submetrics can be used to determine whether the was one long stoppage (e.g. 30 seconds out of the 5 minute long video), whether there were multiple short stoppages (e.g. 10 events of 1 second each out of the 5 minute long video), or both.

In some implementations, the video resolution QoE models and the buffering QoE models may be combined using multi-task learning for more robust and accurate estimation.

The following section discusses the third category of QoE metrics related to startup delay. Startup delay of streaming video content is another one of the categories of QoE metrics that may be determined for when determining a QoE experience with respect streaming media for a UE. Startup delay is defined at the initial time the user has to wait after (s)he clicks a video till the streaming video content application 101 starts the video playback. Unlike IP packet-based analysis, the input data collected according to the techniques disclosed herein enable a rule-based algorithm to estimate the startup delay. The time that a video segment is made available to the UE 102 can be tracked (with the exception of any unknown processing delay introduced by the UE 102) using the endResponseTime. Even if the response bits are delivered to the client (based on packets in downlink to client direction), the response object/video segment is not available to the client app, until the entire object or video segment is received.

Typically, the streaming video content application 101 will request one or more objects or video segments from the servers 103, and the streaming video content application 101 will have to wait for at least one and possible several video segments prior to starting playback. To keep the delay minimal, the apps will request those (one or more) video segments at the start of the video. The input data for estimating the QoE metrics may utilize the TCP and TLS handshake time. The startup delay QoE metric can be defined based on the difference of endResponseTime and startRequestTime for these initial objects, and the connection setup delay (time for TCP handshake+TLS handshake). To handle ambiguity in terms of minimal objects for starting the playback, we can take either the 1st object only, or 1st and 2nd objects if both were requested in parallel, or some weighted combination as the startup delay QoE metric estimate.

For example, a first QoE startup delay metric may be calculated based on a first time, such as that at which a first object was requested (startRequestTime) by the UE 102 and a second time, which may be the time at which a first response including the first object started (startResponseTime) or at which the response ended (endResponseTime) when the first response is received at the UE 102. Where two objects are requested in parallel, a second QoE startup delay metric for the second object may be determined to based on a third time at which the second object was requested (startRequestTime) by UE 102, and a fourth time, at which a second response in which the second object is received. The fourth time may be the time at which receipt of the second object started (startResponseTime) or at which the response ended (endResponseTime) upon completion of the receipt of the second object. The startup delay QoE metric may be set to the first startup delay QoE metric, the second startup QoE metric, or a combination thereof. For example, the first and second startup QoE metrics may be averaged, or a weighed combination of the first and second startup QoE metrics may be determine. In some implementations, more than two startup delay metrics may be calculated, and the values may be averaged, or a weighted average of the values may be calculated.

Additional components in the startup delay, including time for DNS resolution can be added as input to the model if available. Alternatively, a fixed bias or scaling can be applied to account for the same. Lastly, as with the previous two classes of video QoE metrics, even a simple machine-learning based model can be used, which can also correct for the approximate bias or scaling, based on the historical data used during training.

Figure 4:
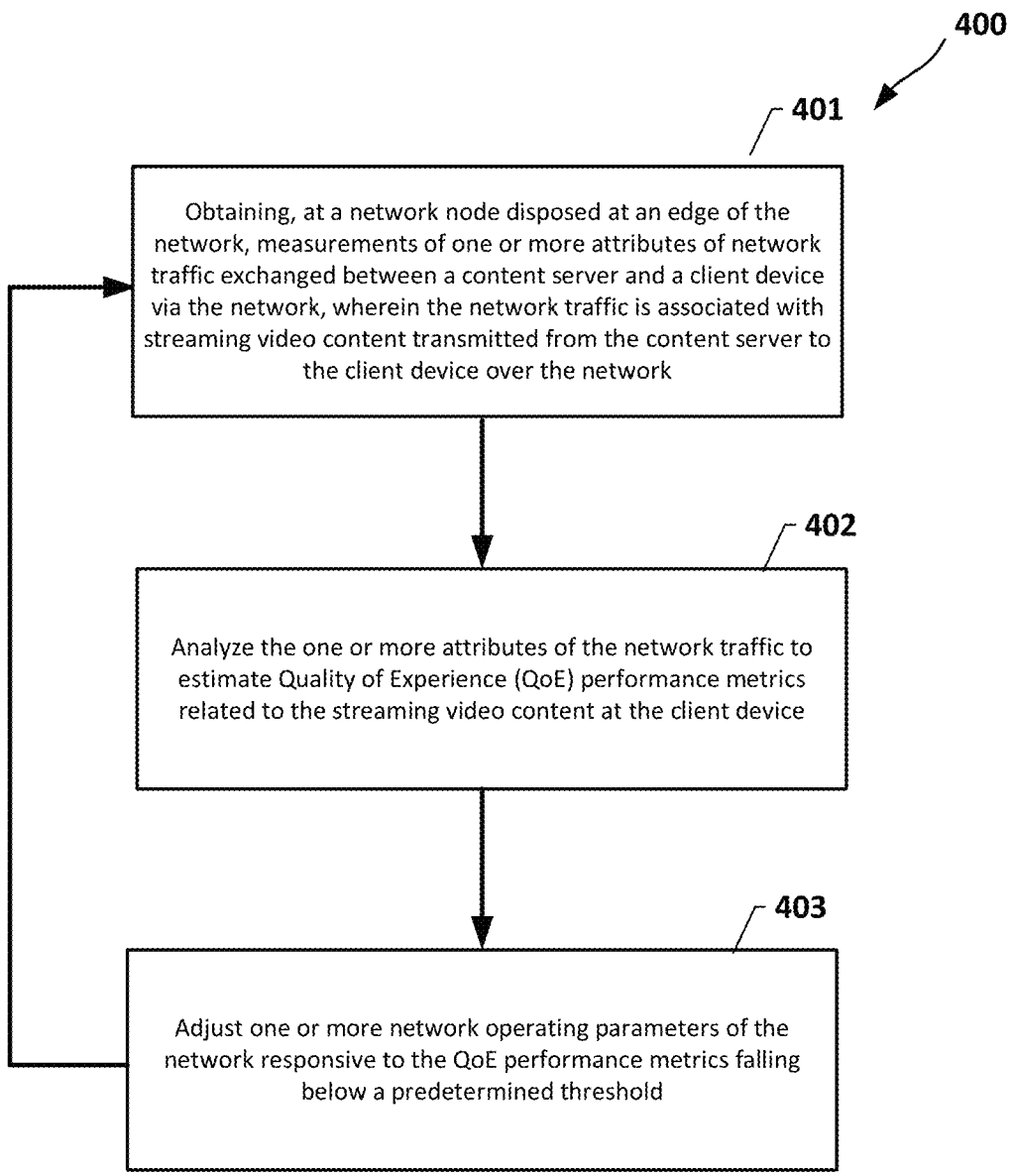
FIG. 4 is a logic flow diagram of operations in an implementation of an example process for diagnosing and correcting connectivity problems in a network.

FIG. 4 is a flow diagram of a process 400 for diagnosing and correcting connectivity problems in a network. The process 400 can be used to estimate Quality of Experience (QoE) performance metrics for processing of streaming media as discussed in the preceding examples. The process 400 can be implemented at a network node disposed at an edge of an ISP's network, such as but not limited to a VSAT or CPE. The network node is disposed between a UE, such as the UE 102, and a content server providing streaming video content, such as the servers 103. Ideally, the measurements of attributes of network traffic are obtained as close as possible to the UE which will be receiving the streaming video content in order to estimate the QoE at the UE as accurately as possible. The QoE metrics can be used to detect problems in the network configuration of the ISP's network that may be proactively addressed and corrected.

The process 400 may include an operation 401 which includes obtaining, at a network node disposed at an edge of the network, measurements of one or more attributes of network traffic exchanged between a content server and a client device via the network, wherein the network traffic is associated with streaming video content transmitted from the content server to the client device over the network. Connection-level data ("CLD") and object-level data ("OBD") can be generated by monitoring various attributes of the network traffic exchanged between the content server, such as the servers 103, and the UE 102. The CLD and OBD can be generated using the various techniques described in the preceding examples.

The process 400 may also include an operation 402 which includes analyzing the one or more attributes of the network traffic to estimate Quality of Experience (QoE) performance metrics related to the streaming video content at the client device. The objective QoE performance metrics may include but are not limited to: (1) streaming resolution change metrics; (2) buffering (stoppages) metrics; and (3) initial start-up delay metrics as discussed in the preceding examples. The QoE performance metrics may be calculated using the machine learning and/or rules-based approaches discussed in the preceding examples.

The process 400 may also include an operation 403 which includes adjusting one or more network operating parameters of the network responsive to the QoE performance metrics falling below a predetermined threshold. The QoE performance metrics falling below the predetermined threshold may trigger automated network diagnostic processes which may identify issues in the network configuration that may be negatively impacting the QoE at the UE 102 with regard to the streaming video content. Threshold related to resolution, buffering, and/or startup delay may be used. For example, in one implementation a resolution of 360p or lower, a buffering duration threshold of 30 seconds or longer, a startup delay of 5 seconds or longer, or a combination thereof may trigger action to be taken to try to improve the QoE at the UE 102. The thresholds may vary depending upon the implementation. Furthermore, the thresholds may vary depending upon certain factors, such as peak-hours, network congestion, the rate plan associated with the customer (lower rate plan may be provided with lower QoE guarantees). Other factors may result in different thresholds being used to trigger actions being taken in response to the estimated QoE.

One action that may be performed in response to determining that the QoE metrics have fallen below a predetermined threshold is to assign a higher priority to traffic associated with the customer for which the estimated QoE metrics have fallen. The streaming traffic associated with the customer may be prioritized at the expense of other traffic associated with the customer, so long as overall system performance experienced by the customer is not impacted too significantly. Other actions may also be taken in addition or instead of prioritizing the network traffic associated with the streaming content of the customer.

FIGS. 5-10 illustrate examples of the models discussed in the preceding examples being applied to real-world data to illustrate that the models provide useful tools for modeling the estimated QoE as per the client device. The ground truth regarding the QoE metrics in these examples were captured using browser application programming interfaces (APIs) at the client device. Furthermore, the test data used to generate the estimated metrics used in the examples of FIGS. 4-9 is distinct from the data used for training and validation of the ML models used to generate the estimated QoE metrics.

Figure 5:
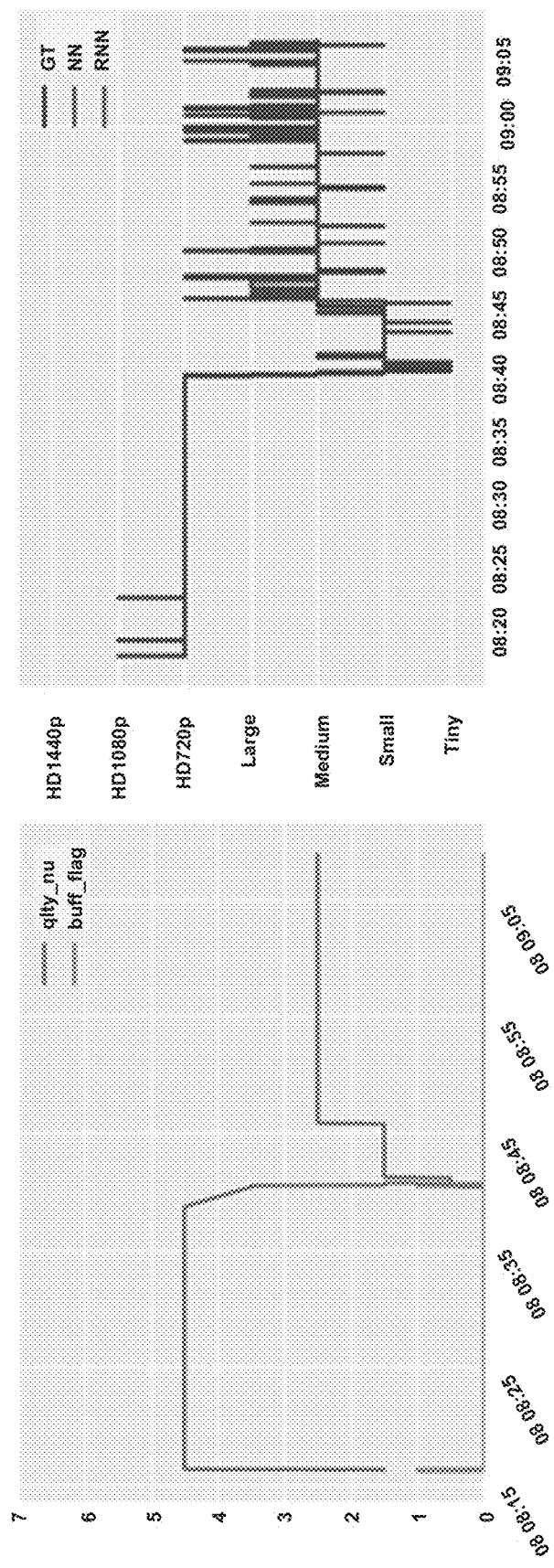
FIG. 5 is a diagram illustrating a comparison between measured video resolution compared to estimated video resolution metrics generated using two different machine learning models.

FIGS. 5-8 illustrate examples of the ML models being applied to estimate video streaming resolution change QoE metrics. FIG. 5 illustrates an example estimate of video streaming resolution at 1 second intervals. In FIG. 5, on the left-hand side a plot related to a sample video run is illustrated. The line (qlty_nu) represents the streaming resolution as noted by the client application and illustrates how the streaming resolution noted by the application varies over time. This variation may be in response to changing network conditions. The right-hand side of FIG. 5 includes a plot illustrating estimated streaming resolution for each second, as estimated using two different ML models (NN & RNN) and compares the estimated streaming resolution with the measured ground truth (GT). The GT in the right-hand plot corresponds to the qlty_nu value in the left plot of FIG. 5. As can be seen from FIG. 5, both of the models accurately estimate the streaming resolution at each time step and even track the resolution changes within a small time delta. The short spikes show in the right-hand subplot of FIG. 5 are the result of inaccuracies in the estimated resolution. These inaccuracies can be decreased with better ML models.

Figure 6:
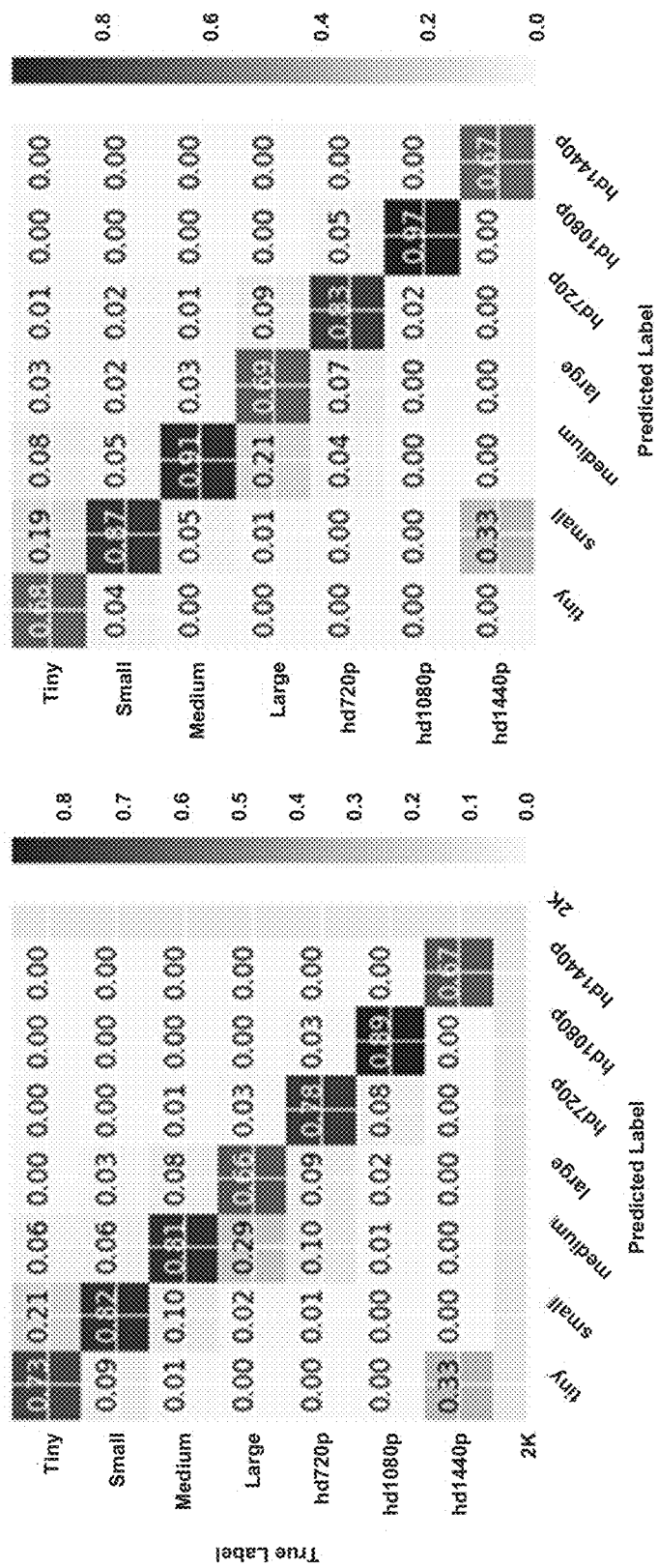
FIG. 6 is a diagram illustrated a comparison between measured longest video resolution per video run 9 compared to estimated longest resolution QoE metrics generated by two different machine learning models.

FIG. 6 illustrates an example in which the longest resolution QoE metric per video run. For each video, which may include varying streaming resolution, an estimated which video resolution is used and compared with ground truth values for video resolution. In this example, both the NN and RNN models performed well in estimating the QoE metric and the errors are mostly close to the diagonal for both models.

Figure 7:
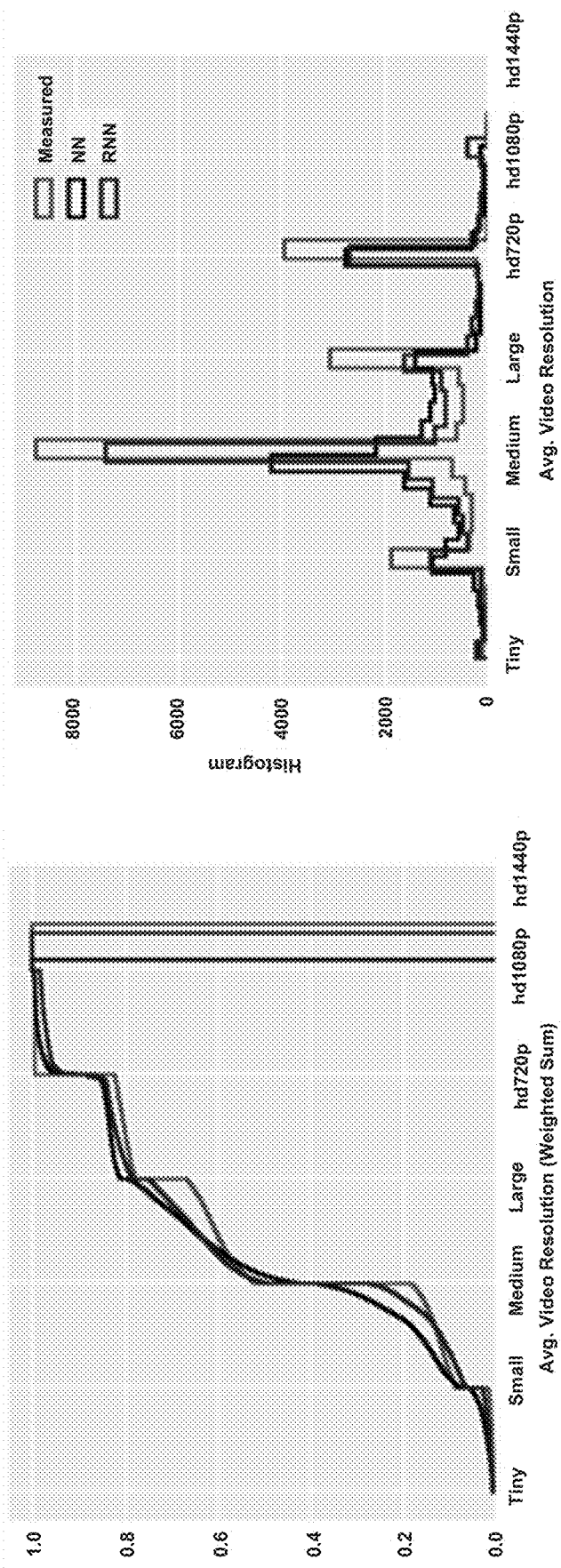
FIG. 7 is a diagram illustrating a comparison between measured average video stream resolution compared to estimated average video stream resolution QoE metrics generated by two different machine learning models.

FIG. 7 illustrates an example in which the average video streaming resolution QoE metric. Instead estimating the resolution that was used the most over a period of time, a weighted average of the streaming resolution is determined to provide an average video streaming resolution QoE. As discussed with respect to the preceding examples, a numerical value may be assigned to each resolution (e.g.: Tiny=0.5, Large=3.5, etc.) and take a time-weighted average. Since the weighted average can be a continuous value, the cumulative distribution function (CDF) and the histogram are plotted for the measured values (ground truth), the estimate produced by the NN model, and the estimates produced by the RNN model. As can be seen, both the models give very good QoE estimates. It is possible to define the Avg. Video Resolution metric differently using different choices of values for each resolution or different way of weighing by time, but since our models accurately estimate resolution even for small time deltas (see FIG. 5), any averaging technique should still yield good estimates.

Figure 8:
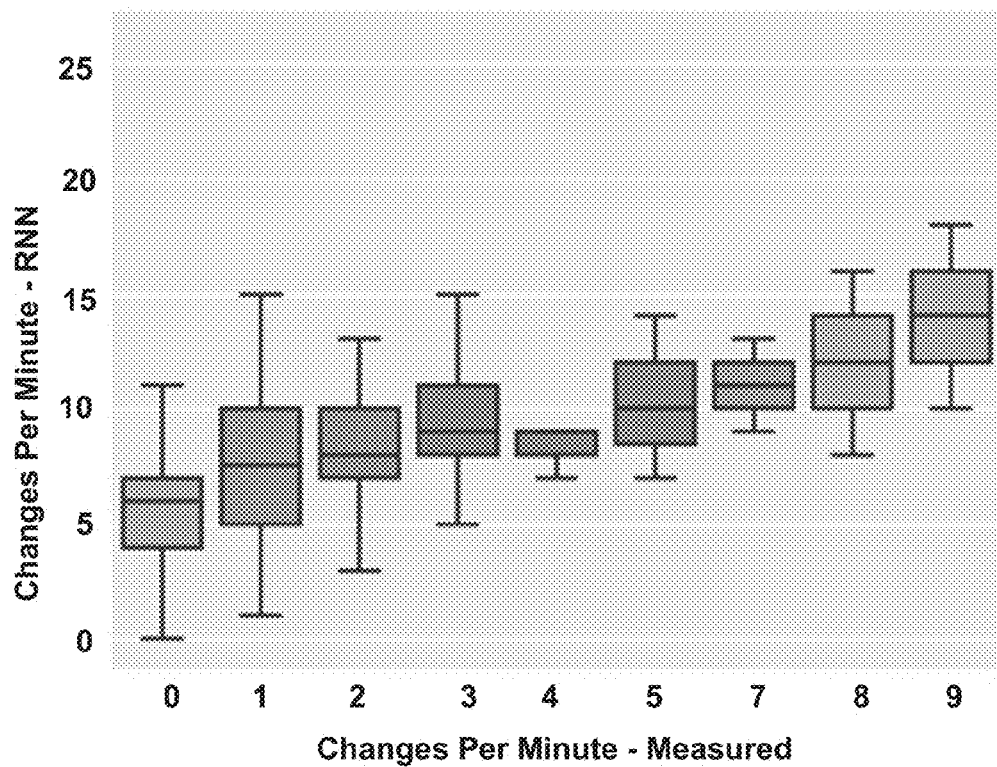
FIG. 8 is a diagram illustrating a comparison between measured changes video stream resolution compared to estimated average changes stream resolution QoE metrics generated by a machine learning model.

FIG. 8 illustrates an example in which the changes in the streaming resolution QoE metric are determined. FIG. 8 is a distribution/box plot of the estimated resolution changes per minute versus the measured ground truth (measured changes in resolution per minute) for the RNN model. The estimates are slightly higher than the ground truth. However, the accuracy of the estimate may be improved by further fine-tuning and retraining of the deep learning models.

Figure 9:
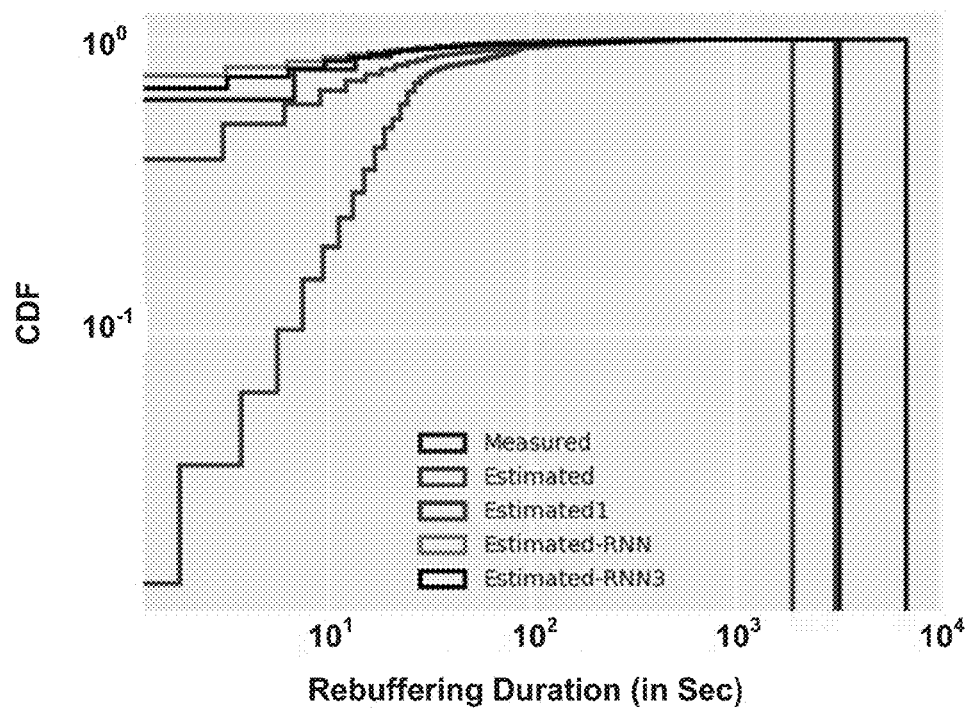
FIG. 9 is a diagram illustrating a comparison between measured video buffering compared to estimated video buffering QoE metrics generated by two different machine learning models and two different rule-based algorithms.

FIG. 9 illustrates an example of the ML models and rules-based algorithms being applied to estimate video buffering QoE metrics. FIG. 9 shows the CDF of the buffering duration QoE metric representing the estimated buffering duration for a video. The results are included for two different deep learning ML models (RNN and RNN3) and for two rule-based algorithms (Estimated and Estimated1). Both of the deep learning models provide a very good estimate of the buffering duration QoE metric, and one of the rule-based model (Estimated) also provides reasonably good results.

Figure 10:
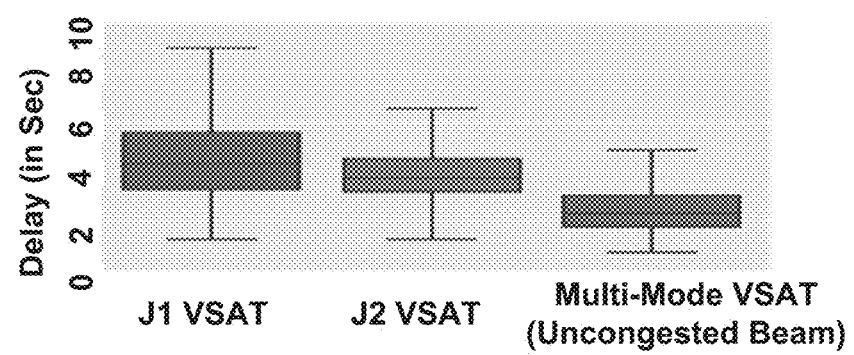
FIG. 10 illustrates an example of the machine models to estimate video start up delay.

FIG. 10 illustrates an example of the ML models to estimate video start up delay QoE metrics. FIG. 10 is a plot of a distribution of estimated QoE metrics for different CPEs with known differences is network conditions. FIG. 10 shows a box plot of the estimated startup delay metrics which seem to match the network conditions. In particular, higher QoE values (higher delays) are found in networks with higher congestion. Hence, even in the absence of ground truth for evaluation & further improvement, the estimated QoE metric is a good indicator of network conditions and thus is a useful QoE metric.

Figure 11:
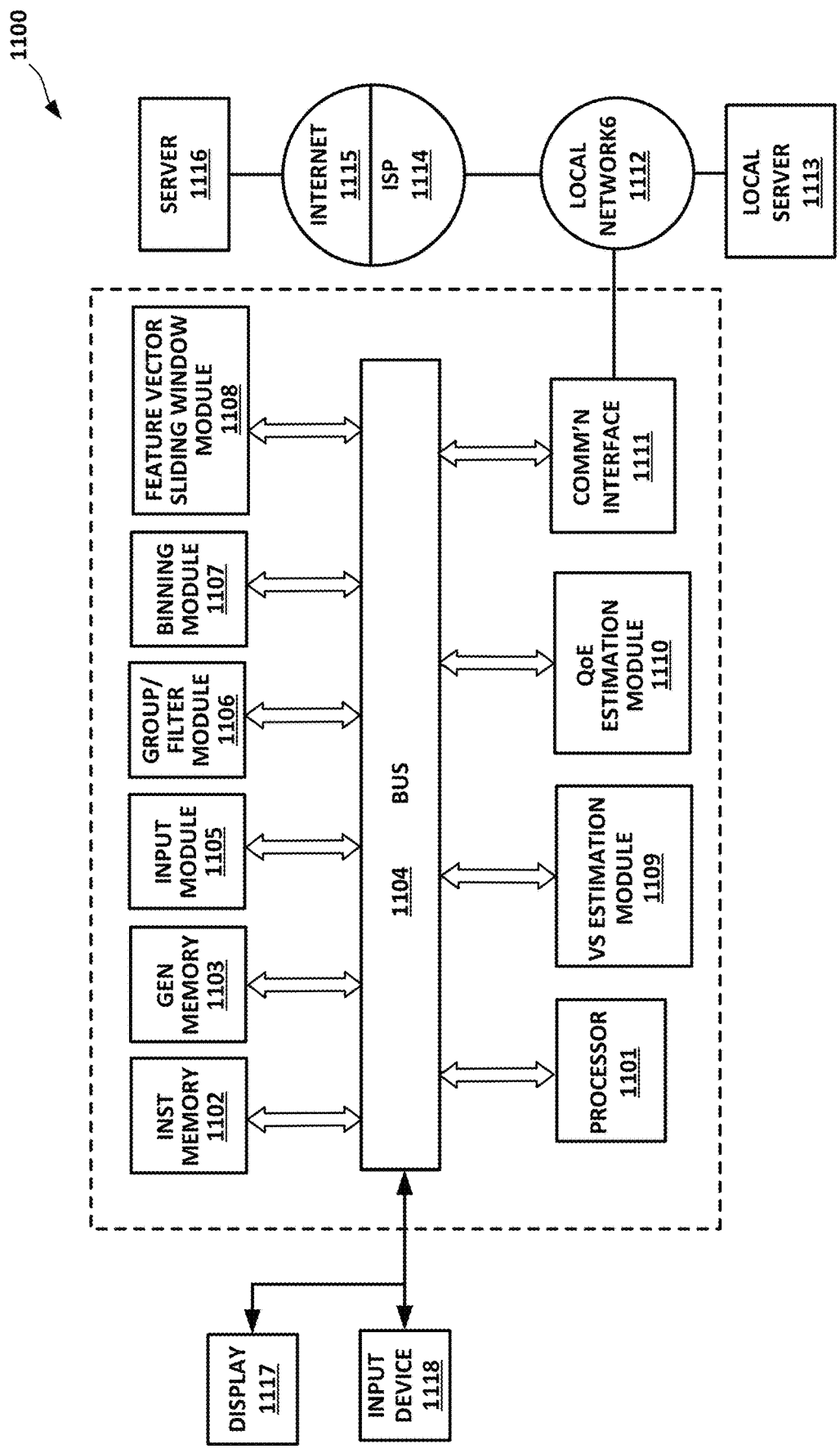
FIG. 11 is a functional block diagram of an example computer system upon which aspects of this disclosure may be implemented.

FIG. 11 is a block diagram illustrating a computer system 1100 upon which aspects of this disclosure may be implemented, such as, but not limited to, particular function blocks and processes described in reference to the preceding figures. It will be understood that logic blocks illustrated in FIG. 11 represent functions, and do not necessarily correspond to particular hardware on a one-to-one basis. The computer system 1100 can include a data processor 1101, instruction memory 1102, and a general-purpose memory 1103, coupled by a bus 1104. The instruction memory 1102 can include a tangible medium retrievably storing computer-readable instructions, that when executed by the data processor 1101 cause the processor to perform functions, processes, and operations implementing an input buffer module 1105, a grouping/filter module 1106, a binning module 1107, a sliding window feature-vector module 1108, an estimation model(s) module 1109, and a QoE module 1110. The estimation model(s) module 1109 can be configured as, or to provide selectability between, any one or more from among a group or collection that can include, for example, a stat-based estimation model, a ML estimation model, a rules-based estimation model. The estimation model(s)

module 1109 can implement, for example, an ML NN estimation model as discussed in the preceding examples.

The QoE module 1110 may be configured to take one or more actions in response to QoE estimates determined by the estimation model(s) 1109. The QoE module 1110 may select one or more operating parameters of one or more components of the ISP's network (e.g. the broadband WAN access network 108) and may modify the one or more operating parameters in response to the QoE estimates. The QoE module 1110 may select one or more network operating parameters that may be modified based on a low QoE score associated with a particular category of QoE metric, such as (1) streaming resolution change metrics, (2) buffering (stoppages) metrics, and (3) initial start-up delay metrics. The QoE module 110 may be configured to execute network diagnostics in response to the QoE estimates, and the QoE module 110 may select certain types of diagnostics to be performed responsive to certain categories of QoE metrics being lower than a predetermined threshold or certain QoE submetrics being lower than a predetermine threshold. The QoE module 1110 may communicate with one more elements of the broadband WAN access network 108 in order to initiate the diagnostics. The QoE module 1110 may, based on the results of these diagnostics, modify one or more operating parameters of one or more elements of the broadband WAN access network 108 to attempt to improve the QoE estimates at the UE 102.

The computer system 1100 can include a communications interface 1111, configured to interface with a local network 1112 for accessing a local server 1113, and to communicate through an ISP 1114 to the Internet 1115, and access a remote server 1116. The computer system 1100 can also include a display 1117 and a user interface or other input device 1118, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computer-implemented method for diagnosing and correcting connectivity problems in a broadband wide area network, the method comprising:
   obtaining, at a network node of the broadband wide area network disposed at customer premises at an edge of the broadband wide area network and network traffic between a content server and a client device passes through the network node, measurements of one or more attributes of the network traffic exchanged between the content server and the client device via the network, wherein the network traffic is associated with streaming video content transmitted from the content server to the client device over the network, wherein obtaining the measurements includes collecting stat data including:
   connection-level stat data for a plurality of transport protocol connections, each transport protocol connection being between the content server and the client device, and
   object-level stat data for each of a plurality of objects comprising a video stream accessed by the client device over a connection of the plurality of connections;

analyzing the one or more attributes of the network traffic to estimate Quality of Experience (QoE) performance metrics related to the streaming video content at the client device using the connection-level stat data and the object-level stat data; and adjusting one or more network operating parameters of the network responsive to QoE performance metrics falling below a predetermined threshold.

2. The method of claim 1, wherein
the object-level stat data includes request-response sizes and timing information for each of the plurality of objects comprising the video stream accessed by the client device over the connection of the plurality of connections, and the network traffic being from the content server for the connection to an application on the client device.

3. The method of claim 1, wherein analyzing the stat data and the one or more attributes of the network traffic to estimate the QoE performance metrics includes estimating at least one streaming resolution change metric for streaming content being transmitted to the client device by:

estimating a resolution of the streaming video content over each time interval of a sequence of time intervals; and determining the at least one streaming resolution change metric by detecting changes in the resolution of the streaming video content.

4. The method of claim 3, wherein the at least one streaming resolution change metric comprises one or more of an average video bitrate over the sequence of time intervals, a most common resolution over the sequence of time intervals, a weight average video resolution, and a number of resolution changes over the sequence of time intervals.

5. The method of claim 3, wherein determining the at least one streaming resolution change metric by detecting changes in the streaming resolution includes:

generating a sequence of feature data, by operations that include, over each time interval in the sequence of time intervals, determining a number of bits of streaming video content received during the time interval; and generating a feature vector, based at least in part on a concatenating of at least a subset of the sequence of feature data.

6. The method of claim 5, further comprising:
estimating the at least one streaming resolution change metric based, at least in part, on inputting the feature vector to a machine learning (ML) model, inputting the feature vector to a statistical model, or both; and outputting the at least one streaming resolution change metric based, at least in part, on a result of said inputting the feature vector.

7. The method of claim 1, wherein estimating the QoE performance metrics includes estimating at least one buffering metric for streaming content being transmitted to the client device by:

estimating whether the client device is buffering the streaming video content over each time interval of a sequence of time intervals; and determining the at least one buffering metric based on the estimating whether the client device is buffering the streaming content.

8. The method of claim 7, wherein the at least one buffering metric comprises one or more of a total buffering duration over the sequence of time intervals, a buffering event rate over the sequence of time intervals, a buffering rate or a fraction of buffering duration.

9. The method of claim 7, wherein determining the at least one buffering metric includes:

generating a sequence of feature data, by operations that include, over each time interval in the sequence of time intervals, determining a number of bits of streaming video content received during the time interval and an estimated number of bits of streaming video content consumed from a video streaming content buffer of the client device; and generating a feature vector, based at least in part on concatenating at least a subset of the sequence of feature data.

10. The method of claim 9, further comprising:
estimating the at least one buffering metric based, at least in part, on inputting the feature vector to a machine learning (ML) model, inputting the feature vector to a statistical model, or both; and outputting the at least one buffering metric based, at least in part, on a result of said inputting the feature vector.

11. The method of claim 1, wherein estimating the QoE performance metrics includes estimating at least one startup delay metric for streaming content being transmitted to the client device by:

generating a sequence of feature data, by operations that include, over each time interval in the sequence of time intervals, determining a number of bits of streaming video content received during the time interval;

generating a feature vector, based at least in part on concatenating at least a subset of the sequence of feature data;

estimating the at least one startup delay metric based, at least in part, on inputting the feature vector to a machine learning (ML) model, inputting the feature vector to a statistical model, or both; and outputting the at least one startup delay metric based, at least in part, on a result of said inputting the feature vector.

12. The method of claim 1, wherein estimating the QoE performance metrics includes estimating at least one startup delay metric for streaming content being transmitted to the client device by:

detecting a first request from the client device at a first time for a first object comprising a first segment of the streaming video content;

detecting a first response from the content server at a second time, the response comprising the first object; and determining the startup delay metric based a first difference between the first time and the second time.

13. The method of claim 12, further comprising:
detecting a second request from the client device at a third time for a second object comprising a second segment of the streaming video content;

detecting a second response from the content server at a fourth time, the response comprising the first object; and determining the startup delay metric based on the first difference between the first time and the second time, and a second difference between the third time and the fourth time.

14. The method of claim 12, wherein determining the startup delay metric based a first difference between the first time and the second time further comprises:

determining the startup delay metric based a first difference between the first time and the second time and an estimated connection setup delay value indicative of an estimated amount of time required to set up a connection between the client device and the content server.

15. The computer-implemented method of claim 1, wherein analyzing the one or more attributes of the network traffic to estimate Quality of Experience (QoE) performance metrics related to the streaming video content at the client device is performed at the network node.

16. The computer-implemented method of claim 1, wherein the network node comprises a customer premises equipment (CPE).

17. A system, comprising:
a processor; and
a memory, coupled to the processor and storing processor-executable instructions that, when executed by the processor, cause the processor to perform operations of:
obtaining, at a network node of a broadband wide area network disposed at an edge of the broadband wide area network and network traffic between a content server and a client device passes through the network node, measurements of one or more attributes of network traffic exchanged between the content server and the client device via the network, wherein the network traffic is associated with streaming video content transmitted from the content server to the client device over the network;
wherein the instructions to obtain the measurements includes instructions configured to cause the processor to perform the operation of collecting stat data, the stat data including:
connection-level stat data for a plurality of different transport protocol connections, each transport protocol connection being between the content server and the client device, and
object-level stat data for each of a plurality of objects comprising a video stream accessed by the client device over a connection of the plurality of connections;
analyzing the one or more attributes of the network traffic to estimate Quality of Experience (QoE) performance metrics related to the streaming video content at the client device using the connection-level stat data and the object-level stat data; and
adjusting one or more network operating parameters of the network responsive to QoE performance metrics falling below a predetermined threshold.

18. The system of claim 17, wherein
the object-level stat data includes request-response sizes and timing information for each of the plurality of objects comprising the video stream accessed by the client device over the connection of the plurality of connections, and the network traffic being from the content server for the connection to an application on the client device.

19. The system of claim 17, wherein the instructions configured to cause the processor to analyze the one or more attributes of the network traffic to estimate the QoE performance metrics include instructions configured to cause the processor to estimate at least one streaming resolution change metric for streaming content being transmitted to the client device by:
estimating a resolution of the streaming video content over each time interval of a sequence of time intervals; and determining the at least one streaming resolution change metric by detecting changes in the resolution of the streaming video content.

20. The system of claim 19, further comprising instructions configured to cause the processor to perform the operation of determining the at least one streaming resolution change metric by detecting changes in the streaming resolution further comprise instructions configured to cause the processor to perform the operations of:
generating a sequence of feature data, by operations that include, over each time interval in the sequence of time intervals, determining a number of bits of streaming video content received during the time interval;
generating a feature vector, based at least in part on concatenating at least a subset of the sequence of feature data;
estimating the at least one streaming resolution change metric is based, at least in part, on inputting the feature vector to a machine learning (ML) model, inputting the feature vector to a statistical model, or both; and
output the at least one streaming resolution change metric based, at least in part, on a result of said inputting the feature vector.

21. The system of claim 17, further comprising instructions configured to cause the processor to perform the operation of estimating a least one buffering metric by causing the processor to perform the operations of:
generating a sequence of feature data, by operations that include, over each time interval in the sequence of time intervals, determining a number of bits of streaming video content received during the time interval and an estimated number of bits of streaming video content consumed from a video streaming content buffer of the client device;
generating a feature vector, based at least in part on concatenating at least a subset of the sequence of feature data;
estimating the at least one buffering metric based, at least in part, on inputting the feature vector to a machine learning (ML) model, inputting the feature vector to a statistical model, or both; and
outputting the at least one buffering metric based, at least in part, on a result of said inputting the feature vector.

22. The system of claim 17, further comprising instructions configured to cause the processor to perform the operation of estimating a least one startup delay metric by causing the processor to perform the operations of:
generating a sequence of feature data, by operations that include, over each time interval in the sequence of time intervals, determining a number of bits of streaming video content received during the time interval;
generating a feature vector, based at least in part on concatenating at least a subset of the sequence of feature data;
estimating the at least one startup delay metric based, at least in part, on inputting the feature vector to a machine learning (ML) model, inputting the feature vector to a statistical model, or both; and
outputting the at least one startup delay metric based, at least in part, on a result of said inputting the feature vector.

* * * * *